June 10, 1952     C. G. ECKERS     2,599,619
METHOD AND APPARATUS FOR CENTRIFUGAL SEPARATION
Filed June 9, 1948     4 Sheets-Sheet 1

Inventor
Carl Göran Eckers
By Davis, Vorie & Faithfull
Attorneys

June 10, 1952  C. G. ECKERS  2,599,619
METHOD AND APPARATUS FOR CENTRIFUGAL SEPARATION
Filed June 9, 1948  4 Sheets-Sheet 2

Inventor
Carl Göran Eckers
By Davis, Hoxie Faithfull
Attorneys

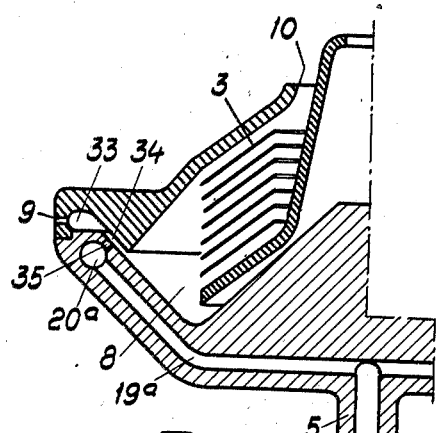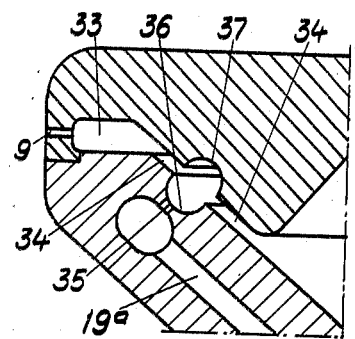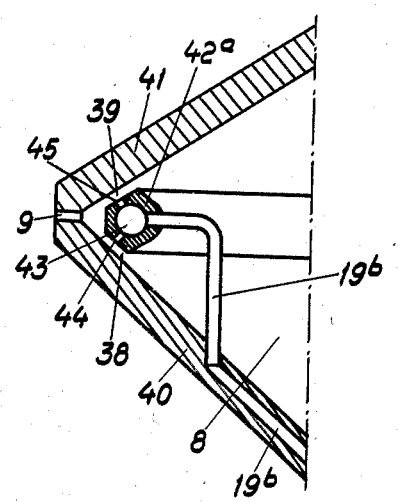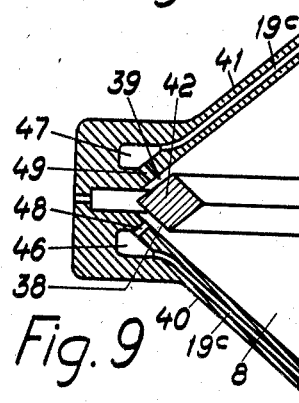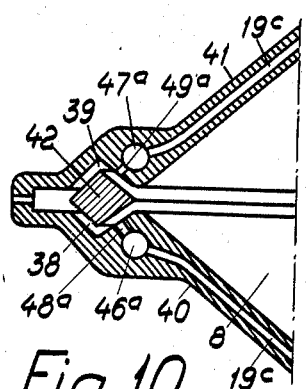
Inventor
Carl Göran Eckers
By Attorneys June 10, 1952   C. G. ECKERS   2,599,619
METHOD AND APPARATUS FOR CENTRIFUGAL SEPARATION
Filed June 9, 1948   4 Sheets-Sheet 4

Inventor
Carl Göran Eckers
By
Attorneys

Patented June 10, 1952

2,599,619

UNITED STATES PATENT OFFICE 2,599,619

METHOD AND APPARATUS FOR CENTRIFUGAL SEPARATION

Carl Goran Eckers, Stockholm, Sweden, assignor to Aktiebolaget Separator, Stockholm, Sweden, a corporation of Sweden Application June 9, 1948, Serial No. 31,854
In Sweden June 13, 1947

20 Claims. (Cl. 233—15)

It is frequently desired (1) to separate from one another two solid components with different specific gravities suspended in a liquid, and also (2) to remove, wholly or partly, the liquid phase from a suspension containing only one solid component, or to replace it by another liquid phase, in order to thereby obtain a purer product.

In the following, the production of starch from grain, such as maize, etc., will be described as an example of the first mentioned problem. In the starch production, a suspension is obtained which contains not only starch particles but also impurities, especially in the form of gluten particles. The starch particles are generally smaller than the gluten particles. The latter have, however, a more irregular shape than the former. Consequently, the starch particles, on an average, have a greater speed of settling than the gluten particles.

If a suspension of these two particles is left to settle by gravity, a bottom layer is obtained which contains starch as well as gluten particles. The two kinds of particles, however, behave differently in that the bottom layer is divided into two layers, an upper and a lower one, of which the former mainly consists of gluten, and the latter mainly of starch. Such a formation of layers can be imagined to take place in the following manner. At the start, the heavier particles settle with the lighter ones, so that the concentration in the lower part of the suspension is increased. Through this increased concentration the particles will come closer to each other, and the heavier starch particles will then act as a liquid of higher specific gravity so that the relatively lighter gluten particles will rise to the surface of a layer, formed by the heavier particles. Consequently the method affords a possibility for separating two solid components in a suspension from each other, and if finally the two components are removed separately, we have accomplished what in the following will be called a selective separation. The border line between the two layers will, however, not be sharp, the separation will be incomplete, and will take a long time. It is also difficult to remove the two separated layers.

A formation in layers of the components can also be obtained by the action of centrifugal force. When using a centrifugal drum with an unperforated wall, the layers will have a sharper boundary line between each other, the division takes place quicker, and the removal of the components is more easily carried out. The work cannot, however, be made continuous, as the separation, the filling and the emptying must take place during separate periods. Conventional centrifugal separators can be made to work completely continuously, but they provide no selective separation worth mentioning. They mainly carry out a concentration work. Under certain circumstances, however, such centrifugal separators can be used to bring about a selective separation.

As an example of the second problem (so-called washing) is the washing of wax by means of naphtha. In this case wax crystals are suspended in a solution of lubricating oil and naphtha, and it is desired to separate the wax crystals from the accompanying lubricating oil and to transfer them to a liquid consisting substantially of naphtha.

This invention relates to a centrifugal separator and to a method for its use intended partly for selective separating and partly for washing. The separator will in the following be described, in the first instance, as used for selective separating, especially the production of starch. According to the invention, the suspension to be separated is led, under the action of the centrifugal force, along one or more surfaces arranged obliquely to the direction of centrifugal force in the separator, which surfaces are screen off in such a manner that the suspension is brought upon them only at that part which is situated closest to the center, a flow of flush or wash liquid also being passed over the surface or surfaces in countercurrent to the suspension. A selective separation thereby takes place on the inclined surfaces, so that the two kinds of particles contained in the suspension are separated from one another in the manner which will be fully described in the following.

The separator to be used for the purpose is of the continuous operation type, having a separating chamber located near the center or axis of the centrifugal bowl and preferably provided with conical discs; the wall of the separator bowl being provided with openings for the continuous discharge of the heavier component. The above-mentioned inclined surfaces act as selective separating zones, and an accumulation of the solid particles primarily ensues on these surfaces under the influence of the centrifugal force, that is, an increase of the concentration is accomplished. The layer, which thus settles on such a surface, will then slide outwards on it. The sliding will cause in its turn a certain agitation in the layer. On account of this agitation as well as the high concentration, a certain rearrangement occurs in the layer of the solid components, so that the heavier components gradually collect at and form a layer lying next to the surface, while the lighter components collect ("rise") in a layer ("above") nearer the rotation axis. Then this last layer, by means of the current of flush or wash liquid led in the opposite direction past the surface, is brought back to the central part of the separator bowl, and from there it is continuously discharged together with the liquid. The sliding along the slanting surfaces prevents the setting of the layer, and thus the gluten particles, imbedded in the concentrate of the starch particles, are given a longer time to rise to the upper part of the layer, that is, that part of the layer which is farthest from the surface. In order to obtain the best possible result of the separation, it is important that the layer slide with the proper speed along the slanting surface. The angle which the surface makes with the direction of the centrifugal force is then of importance, as the sliding speed will diminish when the angle is increased, and vice versa. The most suitable value for this angle varies with different material and must be determined in each case. By the slant of the surface, the sliding speed is decreased so that the layer obtains a certain thickness, that is, so that the heavier component will form a continuous cohering layer upon which the lighter particles will collect.

It is important that no new material be brought upon the slanting surface except in the sliding direction, as otherwise the intended rearrangement of the layers will be quite incomplete, or even made impossible. The slanting surface ought to be shielded so that the stated condition will be fulfilled. Furthermore, since the return of the lighter separated particles to the center of the separator bowl requires a current of liquid in the opposite direction to the sliding direction, it is desirable to lead the slanting surface from one boundary surface of a slot where, to its outer part, flush or wash liquid of such a quality (specific gravity) and in such quantity is supplied that an inwardly directed liquid current results. The velocity of the inwardly directed current must then be adjusted so that the lighter particles are flushed off and brought inwardly into the separator bowl in order to be discharged through the separating chamber, at the center, with the separated liquid which comes from the suspension. The flush or wash liquid is supplied to the slot, either perpendicularly or obliquely to the slanting surface. The velocity of the flush or wash liquid on entering the slot must be adjusted according to the thickness of the slot, the thickness of the layer of the lighter particles, and the degree of stirring which it is desired to produce with the flush or wash liquid. The velocity of the discharging liquid must not be so great, however, that the flush or wash liquid will penetrate into or through the layer of starch particles, if there is no intention to undertake a new mixing in the slot and a reseparating of the heavier particles in part of the slot situated farther out from the rotation axis. The added flush or wash liquid must be evenly distributed over the whole sliding layer on the slanting surface. Care must then be taken that the variations of pressure which may arise in the separator bowl do not appreciably influence the quantity of the added flush or wash liquid. This can be accomplished by bringing the flush or wash liquid under high pressure into a great number of channels evenly distributed over the slanting surface. These channels are so dimensioned that the drop in pressure will be relatively large.

For a better understanding of the invention, reference may be had to the accompanying drawings, in which Fig. 1 is a vertical sectional view of one form of the new separator;

Figs. 3, 4, 6 and 11 are views similar to Fig. 1 but showing different forms of the separator;

Figs. 5 and 7 through 10 are detail vertical sectional views of different modifications of the selective separating zone in the separator bowl.

Figure 1:
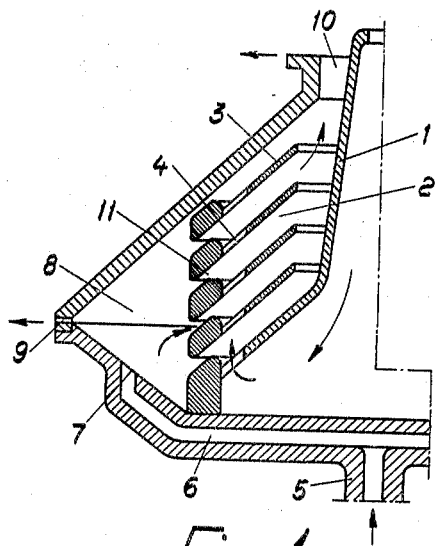

In the centrifugal separator illustrated in Fig. 1, the material to be separated is supplied to the separator bowl or locus of centrifugal force through a distributor 1 and flows into the space 2 between a number of conical discs 3 through distribution holes 4 arranged in the discs. Through the hollow spindle 5 and a number of channels 6 (the orifices 7 of which may be provided with nozzles) flush or wash liquid is supplied to the concentration or collection chamber 8. The separator bowl is provided with a number of discharge nozzles 9 forming heavier component outlets at its periphery or circumference, and at the center with a ring-shaped overflow discharge or outlet 10. The selective separation zone of this separator is placed at the outer part of the discs, where the inter-spaces 11 between the discs for this purpose are constricted by means of enlargements or rings arranged on the outside of the discs and forming outwardly extending surfaces inclined to the direction of centrifugal force.

The above-described separator operates in the following way when, for instance, a starch suspension is being treated. The material to be separated is supplied through the distribution holes 4 to the disc set and is distributed mainly over the wider part 2 of the inter-spaces between the discs, where an inwardly directed current of liquid is obtained from which the solid particles (starch and gluten) are separated out and settled on the inside of the discs. These solid particles are then moved along the inside of the discs, under the action of the centrifugal force, toward the outer part of the discs. Thus, an accumulation of solid particles is formed on the inside of the discs, whereby the concentration is so great that the particles are lying quite close to each other. A rearrangement therefore takes place as a result of the particles sliding along the disc surface and on account of the difference in specific gravity of the particles, so that the heavy starch particles displace the gluten particles and place themselves next to the disc surface. In other words, a formation of layers occurs so that next to the disc a layer of heavy starch particles is formed, and then a layer of light starch particles, and these layers in general follow each other during the sliding toward the circumference of the discs. When the starch and gluten particles on their way along the inner surface of the disc enter the constricted part 11 of the inter-spaces between the discs, they are met by an inwardly directed current of liquid coming from the flush or wash liquid supplied through the openings 7. The velocity of this liquid is such that the gluten particles sliding on top of the starch layer are carried off with the liquid and brought back to the center of the bowl. Due to the difference in specific gravity of the starch and gluten particles, it is possible to adjust the velocity of the inwardly directed current of liquid so that the gluten particles are carried off with the current of liquid, while the starch particles continue on their outward course (under the action of the centrifugal force) into the concentrating chamber 8, which they then leave through the discharge nozzles or orifices 9. The gluten particles, which follow the inwardly directed current of liquid, discharge with the latter over the level outlet 10.

The distribution of velocity, which exists in the inter-spaces 2 between the discs and also in the constricted inter-spaces 11, also contributes to facilitating the separation of the two kinds of particles from each other. This will be appreciated when it is considered that the gluten particles generally are larger than the starch particles. Therefore, if a gluten and a starch particle are on the same surface, the different rates of velocity in a liquid flowing over the surface will act on the larger gluten particle with a greater force than on the starch particle, as the gluten particle extends into a layer of the liquid flowing past with a greater velocity than the liquid layers into which the smaller starch particle extends. The capacity of selective separation of the reduced inter-spaces 11 depends not only on the size of the inter-spaces but also on the quantity of material supplied through the distribution holes 4 as well as on its concentration and properties, and also on the quantity and the nature of the flush and wash liquid supplied through the flush liquid feeding means including the channels 6. The length and the other dimensions of the selective separating zone must therefore be determined in each case according to the kind of material to be separated.

Figure 2:
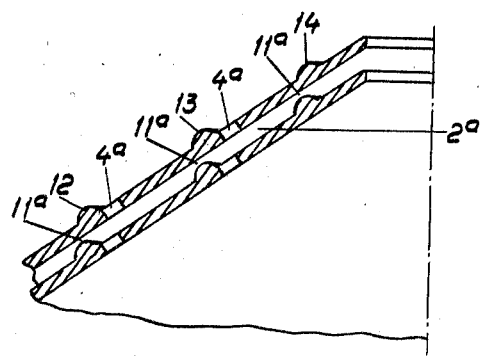
Fig. 2 is a detail vertical sectional view of a modified form of the discs for the separator in Fig. 1.

In Fig. 2 I have shown diagrammatically another form of the discs for the centrifugal separator illustrated in Fig. 1. The discs according to Fig. 2 are provided on the outside with several concentric ring-shaped elevations 12, 13 and 14, by which several constrictions 11a are formed in the inter-spaces between the discs. The distribution holes 4a are then placed on the inside of one or several of these constrictions. In the inter-space 2a between two adjacent constrictions 11a, there takes place a settlement of starch and gluten particles on the inside of the discs in the same way as has been described in connection with Fig. 1 regarding the inter-spaces 2. The sediment slides outwardly along the disc surface, and at the constrictions 11a a certain return of the sidement's gluten particles takes place toward the center of the bowl. The thickness of the sediment will then be increasing from one constriction 11a to that constriction which is lying next outside. With this shape of the discs, as with the shape shown in Fig. 1, the concentration of the sediment on the inside of the discs will become so great that the particles come in contact with each other, and due to their different specific gravities, a rearrangement of gluten and starch particles takes place so that the layer nearest to the inner surface of the discs will consist mainly or wholly of starch particles, while the gluten particles of the sediment accumulate "on top of" this layer.

The number of concentric ring-shaped elevations on each disc can vary within wide limits, as well as the width of the elevations along the disc surface, reckoned in the direction of the generatrix. As a limit, that case can be imagined where the selective separating zone extends along the entire length of the disc generatrix while the inter-space between the discs continually decreases from the inner edge of the discs to their outer edges. This can be accomplished by making the outer surface of the discs with a curved generatrix, so that the height of the inter-spaces varies with the distance from the center, or by dividing the inter-spaces (as by means of caulks of increasing width) into channels with decreasing width toward the outer edges of the discs.

Figure 3:
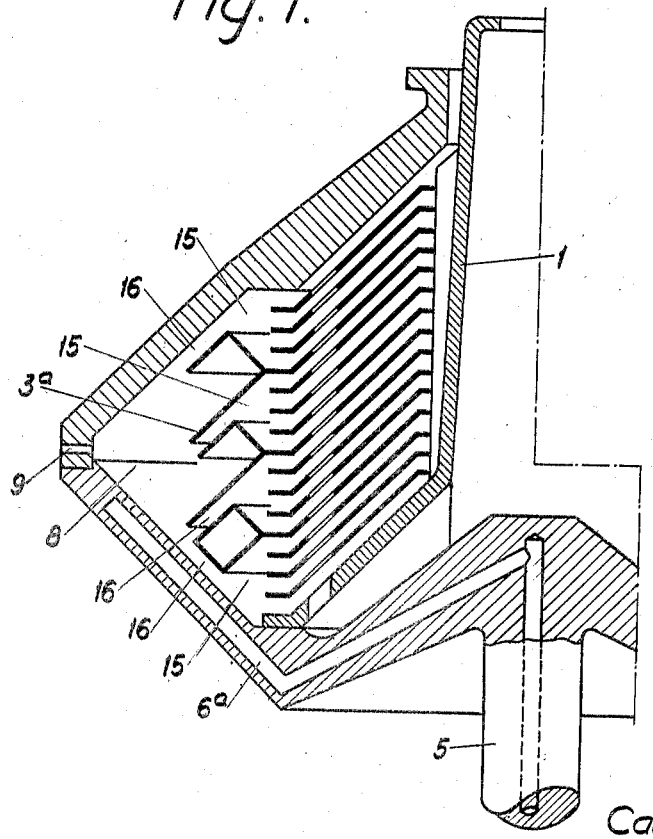

The separator shown in Fig. 1 can be provided with a series of shorter discs by means of which the inter-spaces 2, arranged inside the constrictions 11, are divided into a number of smaller inter-spaces. Also, as shown in Fig. 3, the discs can be brought together in groups each having its smaller collection chamber 15 which, by means of a constricted passage 16, opens into the common concentrating or collecting chamber 8 to which the flush or wash liquid is supplied through channels 6a. In the arrangement according to Fig. 3, this is obtained by providing every fourth insert disc with peripheral extensions 3a which are bent in such a manner that they partition off the above-mentioned small collecting chambers and passages. The selective separating zone is then, as in the arrangement according to Figs. 1 and 2, placed mainly in the concentrating or collecting chamber.

Figure 4:
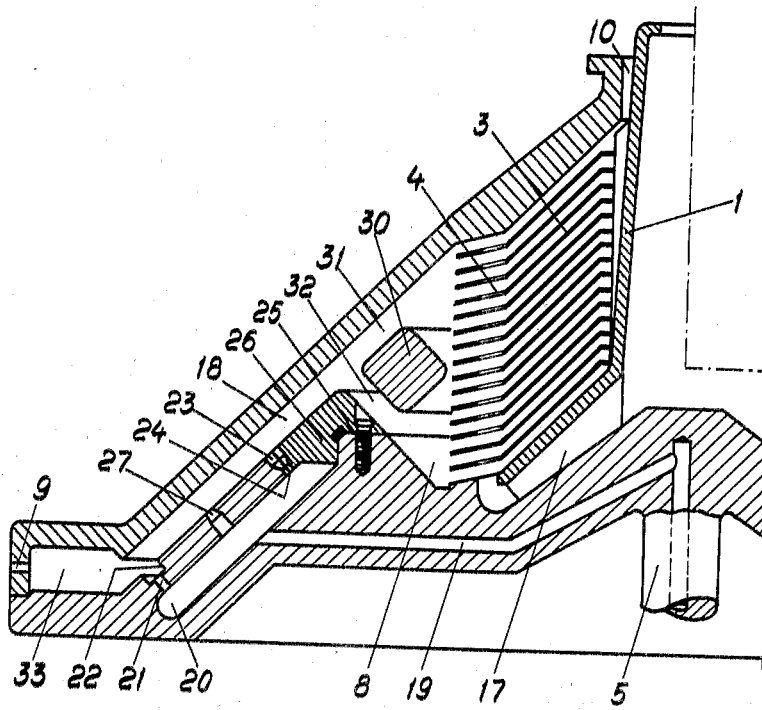

In Fig. 4, a centrifugal separator is shown wherein the selective separating zone is placed outside the disc set 3, and the concentrating or collecting chamber 8 is arranged outside the disc set. The material to be separated is delivered through the distributor 1, providing with channels 17 forming an inlet leading into the collecting chamber 8. The lighter component leaves through the edge discharge 10. The selective separating zone is formed by an extended conical slot 18. The slot is supplied with flush or wash liquid through a channel arranged in the bowl spindle 5, which channel is connected, by means of channels 19 arranged in the lower part of the bowl, with a ring-shaped chamber 20 arranged at the slot and forming a common supply of liquid for a number of channels opening into the outer part of the slot 18. The latter channels consist of a large number of circumferentially spaced, evenly distributed fine holes 21 opening into the bottom of one or several troughs 22, which in turn open toward the slot 18. The slot 18 is further connected, by means of a series of channels arranged nearer the collecting chamber 8, with the ring-shaped chamber 20. These last channels consist of a number of circumferentially spaced holes which have one part 23 made with a larger diameter than their other part 24. These holes are formed by recesses or grooves in the conical contact surface of a ring 26 arranged in the separator bowl and fixed with screws 25, and in the corresponding contact surface in the separator bowl. Between these two rows of channels, I have shown another row of channels 27 which connect the slot 18 with the ring-shaped chamber 20. These channels serve another purpose than the above-mentioned channels 21, 22, 23, 24, which are intended for the supply of flush or wash liquid to the slot in such a way that the liquid supply will be substantially evenly distributed around the whole circumference with the least possible disturbance of the starch layer sliding on the upper border surface of the slot 18. This is obtained by constricting one part of each channel 21 and 24 so that a considerable drop in pressure occurs. The liquid supply through the channels will then be rather independent of the pressure variations which may occur in the slot 18, and in the ring-shaped chamber 20. The pressure drop in the constricted parts 21 and 24 must not, however, cause such a high out-flow velocity of the flush or wash liquid that the sliding starch layer, lying "under" the gluten layer and on the upper border surface of slot 18, will be broken up by the liquid. The trough 22 and the larger diameter part 23 prevent the velocity of the liquid flowing into the slot from reaching or exceeding that limit value at which the jets of liquid will penetrate the whole thickness of the slot. The channels 27, on the contrary, are intended to supply flush or wash liquid to the slot 18 at such a higher velocity that the starch and gluten layers sliding along in the slot are broken up and mixed when passing these channels.

Still referring to Fig. 4, the operation is as follows: When a layer, consisting of mixed starch and gluten particles, slides along a surface slanting against the direction of the centrifugal force in the separator, the starch particles will tend on account of their higher specific gravity, as mentioned, to approach the surface, while the gluten particles will be displaced and collect on top of the starch layer, whence they are removed by flushing according to the invention. It occurs, however, that some of the gluten particles are of such a size and shape and have such a starting position that they do not have time to reach the gluten layer but are enclosed in the starch layer. It is therefore advisable to break up the layer again by flushing with flush or wash liquid through the channels 27, and then let the particles once again be submitted to rearrangement before they pass the last row of channels (21, 22) for supplying flush or wash liquid. In order to produce an effective mixing action, it may be necessary to supply the channels 27 from a ring-shaped chamber entirely separated from the ring-shaped chamber 20. The channels 27 produce in effect a division of the selective separating zone into two sub-zones. The number of sub-zones can, by arranging several rows of flush or wash liquid supply channels, be increased as required. On the other hand, in certain cases it may be sufficient to have but one row of such channels.

Figure 5:
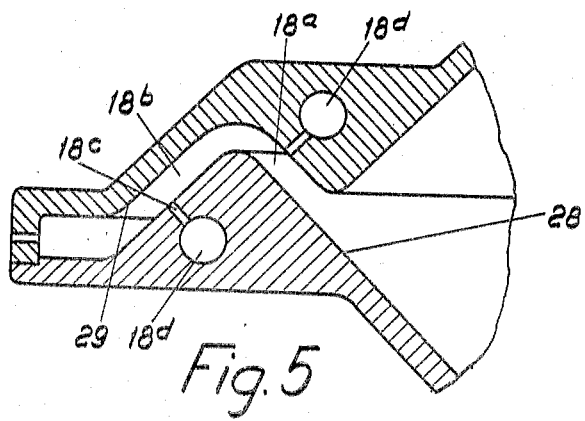

A similar division of the selective separation zone into sub-zones can also be made in other ways, for instance, as shown in Fig. 5, by dividing the slot into two or several sub-slots 18ª and 18ᵇ forming an angle with each other. Each such sub-slot is then provided with a supply of flush or wash liquid as by means of holes 18ᶜ leading from two separate channels 18ᵈ. The solid particles first slide along the surface 28 through the slot 18ª, and then along the surface 29 through the slot 18ᵇ. When passing from the surface 28 to the surface 29, a breaking up and mixing action takes place of all the particles before they are again separated out through the influence of the centrifugal force into the respective layers in the slot 18ᵇ.

The use of the loose ring 26 enables a simplification in making the channels 23, 24, as these can then be made with milling tools. The channels are either in the form of grooves in both the contact surfaces, as shown in Fig. 4, or are in only one contact surface, for instance in the contact surface on the ring 26. The arrangement, besides, has the advantage that it is easy to clean the channels. The same design can, of course, be applied also for the holes 21, 27, but may be used to particular advantage in those cases where only one row of flush or wash liquid supply channels is arranged in the slot 18. It is also possible, instead of using the wider bores 23, to arrange an open trough similar to the trough 22. On the other hand, the trough 22 can also be replaced by holes of a larger diameter than the holes 21. The supply channels for the flush or wash liquid may be made with an expanding area progressively increasing from the ring-shaped chamber 20 to the slot 18.

In the collecting chamber of the separator bowl, there is a ring 30 with square cross section which, together with the sides of the chamber, forms passages 31, 32 facilitating the formation of layers of the concentrate which is required for the selective separation in the slot 18.

The discs 3, arranged in the separating chamber, are so long that they extend out into the collecting chamber 8 and partly fill the latter. That part of the discs which extends into the collecting chamber is made with a larger cone angle than the other part and is provided with the distribution holes 4 through which the material to be separated, supplied through the channels 17, is carried into the inter-spaces between the discs. This arrangement prevents the undesirable formations of whirls in the collecting chamber, which otherwise would arise when the material to be separated from the channels 17 flows into the collecting chamber. Such whirl formations cause a strong mixing of the concentrate (issuing from the separating chamber into the collecting chamber) with the material to be separated (supplied from the channels 17) thereby diluting the concentrate in the collecting chamber so that it must be concentrated again before entering the selective separating zone. By thus extending the insert discs 3 into the collecting chamber, a stratified, orderly current is obtained so that the above-mentioned difficulty is largely avoided. Considering the fact that the concentrated suspension demands a larger space, it is suitable to make the discs with a greater cone angle in the collecting chamber than in the separating chamber. This facilitates the sliding of the concentrate along the discs in the collecting chamber. The distribution holes 4 may also be located in the separating chamber, but must then always be placed in the passage zone between the collecting and the separating chambers.

The pure separated starch is discharged from the separator through openings 9 in the wall of the bowl, these openings leading from a slip chamber 33 arranged outside the selective separating zone 18. This slip chamber 33 prevents starch sediment from accumulating between the several orifices or openings 9.

In Fig. 6, another centrifugal separator is shown wherein the selective separating zone, as in Fig. 4, is placed outside the insert discs 3 and the collecting chamber 8, the latter being arranged outside the insert discs. As in the separator according to Fig. 4, a concentration of the starch suspension takes place mainly in the disc set. The resulting concentrate is collected in the collecting chamber 8, and the starch and gluten particles slide along the sides of the chamber out to a conical slot 34. By the action of the flush or wash liquid introduced through passages or channels 19ª, 20ª the gluten particles in slot 34 are separated from the starch particles and returned to the collecting chamber 8, from which they gradually discharge over the edge 10 arranged at the central part of the bowl. The starch particles continue, particularly along the lower boundary surface of the slot 34, out into the slip chamber 33 and finally leave through the openings 9. In this case as well, the flush liquid is supplied through the hollow axle 5 which feeds the channels 19ª in the lower part of the bowl and the annular chamber 20ª, but the liquid is fed in through holes 35 on the outside of the slot 34 and must, consequently, break through the starch layer which slides on the lower boundary surface of the slot. As a result, the flush or wash liquid causes a re-suspension and mixing of the starch and gluten particles, which makes it possible for such gluten particles as have not had time to separate out from the starch layer, to free themselves from the starch and leave with the flush or wash liquid over the outlet 10.

In order to produce a complete mixing and formation of starch milk at the openings of the holes 35 into the slot, a mixing chamber can be arranged in the slot 34, as shown in Fig. 7, by means of grooves 36, 37 in the boundary surface of the slot.

In Figs. 8, 9 and 10, I have shown other embodiments of the selective separating zone itself, where it is placed outside the collecting chamber 8. According to these embodiments, the separator is provided with two conical slots 38, 39, which are symmetrically located with regard to a plane perpendicular to the axis of the separator bowl, the slots being formed between the walls 40, 41 of the bowl and an annular insert 42 arranged in the bowl. In the arrangement according to Fig. 8, the supply of flush liquid is delivered from channels 19ᵇ by means of an annular chamber 43 arranged in the annular insert 42ª, and a number of holes 44, 45 leading to the inside of the two conical slots. In the arrangement according to Fig. 9, the flush liquid is supplied from two channels 19ᶜ to respective chambers 46, 47 arranged in the wall of the bowl and, by means of a number of holes 48, 49, connected with the outside of the two slots. In the arrangement according to Fig. 10, there are two annular chambers 46ª, 47ª, arranged in substantially the same way as in Fig. 9, but the liquid is supplied through the holes 48ª, 49ª to the inside of the slots.

In the embodiment according to Fig. 8, the starch and gluten particles slide along the two bowl walls 40, 41 and meet the flush liquid supplied from the opposite side of the slots through the holes 44, 45; while, in the embodiment according to Fig. 9, the flush liquid supplied through the holes 48, 49 breaks through the starch and gluten layer, which is sliding along the bowl wall. In the arrangement according to Fig. 10, each slot 38, 39 has an inward extending section at about right angles thereto, in which there likewise occurs a remixing of the particles.

Figure 11:
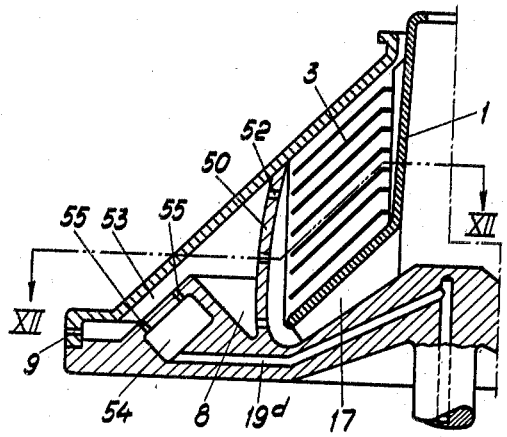
Figure 12:
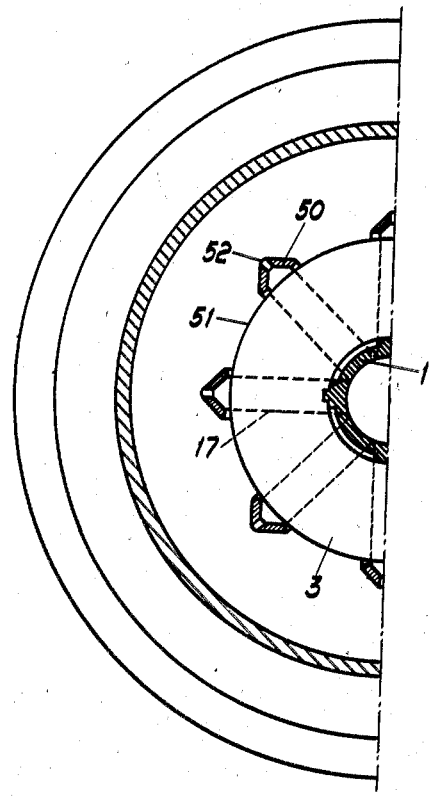
Fig. 12 is a sectional view on the line XII—XII in Fig. 11.

The separator bowl shown in Figs. 11 and 12 differs from the one shown in Fig. 4 mainly in that the discs do not extend into the collecting chamber 8. Directly opposite the channels 17 in the distributor 1, and outside the discs 3 arranged in the separating chamber, there are instead troughs or channels 50 arranged in the collecting chamber. These troughs are, as seen in Fig. 12, V-shaped and open up to the discs. The effect of this arrangement is that the liquid to be separated, without any formation of whirls in the collecting chamber, can be brought substantially directly into the separating chamber from the channels 17; while the material separated out in the separating chamber, without being appreciably mixed with the supplied liquid, passes into the collecting chamber 8 through those parts 51 of the discs' circumference which are located between the troughs 50. Each trough is provided at the bottom (outside) with small holes or slits 52 through which solid particles, which may become separated from the liquid in the troughs, can go directly to the collecting chamber. The conical slot 53 forms the selective separation zone outside the collecting chamber 8, and it is supplied with flush liquid through channels 19ᵈ, annular chamber 54 and holes 55.

The separator may take other forms than those illustrated. For instance, instead of using the cone-shaped slot for the selective separating zone, as shown in the drawings (where the axis of the slot coincides with the axis of the separator bowl), it is possible to arrange a number of cone-shaped slots distributed around the circumference of the bowl, with the axis of each slot substantially at right angles to the axis of the bowl. These slots can be formed by conical holes arranged in the bowl wall, into which conical bodies are inserted in a suitable manner so that each slot is defined by the wall of a hole and the spaced wall of the corresponding insert body. Also the separator may have one selective separating zone placed immediately outside the disc set or in connection with it, and one selective separating zone arranged outside the sludge chamber (which receives separated starch from the first selective separating zone). The separator can also be so designed that the whole, or substantially the whole, separator bowl is occupied by the selective separating zone; but in that case the separating capacity of the separator or its throughput will be very small. This can be balanced by feeding the separator with a material (to be separated) of rather high concentration, for instance 15–22° Bé., which makes the liquid quantity very small.

Finally, the separator bowl can be made in two superimposed sections and the material to be separated can then be delivered directly between two groups of discs in the respective sections, an upper group and a lower group. The bowl may then have two rows of outlet openings arranged in the bowl wall.

It is of importance that the selective separating zone be sufficiently large; that is, that the slot (or slots) for this purpose be sufficiently long so that the selective separation has time to be effected in it. It is also of importance that the slot (or slots) be placed in such a way, or such other arrangements be made, that the particles in the slot are directed toward the boundary surface or surfaces of the slot where the velocity of the flush or wash liquid can contribute to the dividing up of the starch and gluten particles. Consequently, the slot should be bounded by at least one surface slanting against the direction of the centrifugal force. The slot does not, therefore, have to be made conical, as has been heretofore described. It is also possible to use a number of columns, which may be spaced apart from each other, where the boundary surfaces are substantially parallel with the axis of the separator bowl and distributed around the circumference of the separator bowl. In analogy with this, discs parallel with the axis of the separator bowl can be used, and these are then made so that the inter-spaces between them, at least partly, are given such a shape that a selective separation can be effected in them.

It will be apparent from the foregoing that each of the illustrated embodiments of the invention includes means for screening off the inclined surface (or surfaces) along which the particles move during their selective separation after concentration in the disc spaces, such means forming with the inclined surface a slot-shaped channel having its entrance at the end nearest the bowl axis. Thus, the screening means in Fig. 1 include the thickened parts of the discs themselves, and in Fig. 3 the parts of the disc extensions forming the inner walls of the slot-shaped channels; while in the remaining embodiments they include the parts lying outside the discs and forming the inner walls of the slot-shaped channels 18, 18$^a$, 18$^b$, 31, 32, 34, 38, 39 and 53. Also, the various embodiments include means for distributing a flow of wash or flush liquid over the inclined surface simultaneously with the material to be separated, the distributing means comprising the liquid feed channels 6, 6$^a$, 18$^c$, 18$^d$, 19—24, 19$^a$, 19$^b$, 19$^c$ and 19$^d$.

All the embodiments of the centrifugal separator of the invention, as described in the foregoing, may also be used for washing. As the procedure will be substantially the same when used in connection with any of the illustrated embodiments, the washing process will in the following be described only with reference to the embodiment illustrated in Fig. 4. In the case of purifying wax, the material to be separated consists of wax crystals suspended in a mixture of naphtha and lubricating oil, and is fed through distributor 1, channels 17, and openings 4 to the separating chamber which is provided with the discs 3 and in which a part of the liquid contained in the suspension is separated, this liquid being discharged over the level outlet 10. In the collecting chamber 8, a sludge concentrate is obtained which proceeds to the conical slot 18 and then flows substantially along the outer surface of this slot into the sliding chamber 33.

The wash liquid, which in the described example is naphtha, is fed to the slot 18 through openings 21, 23, 27. When passing through the channel 18, the wax crystals sliding along its outer surface are subjected to the action of the wash liquid which, according to circumstances, displaces a larger or smaller part of the liquid accompanying the solid particles from the collecting chamber 8 out into the channel 18. Thus, the wash liquid more or less accompanies the solid particles through the openings 9, but part of it also accompanies the inward flow of the displaced liquid passing toward the center of the separator bowl. According to circumstances, the washing may be carried out in such a manner that the sludge concentration increases outside the openings through which the wash liquid is supplied, or so that the sludge concentration remains unchanged in this part of the separator bowl, or, finally, in such a manner that it is reduced. The principal importance of such treatment is that the solid particles are subjected to washing which is accomplished by more or less of the original carrier liquid for the particles being displaced or replaced by the added wash liquid.

I claim:

1. A method of separating from one another two different solid components suspended in a liquid, by selective separation under centrifugal force, which comprises feeding the suspension to a locus of centrifugal force and there, in an initial separating zone thereof, separating liquid and lighter solid components from the heavier solid components, leading said last liquid and lighter components inwardly from said zone and discharging the same from the locus, leading the resultant relatively concentrated suspension of said heavier components together with the remaining lighter components outwardly in said locus and beyond said zone and then, in an outer selective zone, leading said last suspension outwardly, while subjected to centrifugal force, along the outer surface of a narrow slot inclined to the direction of said force in the locus, flowing over the inner surface of said slot in countercurrent but parallel to said last suspension a flush liquid of lower specific gravity than said last suspension, lighter components of said last suspension meet a countercurrent flow of flush liquid while confined in said slot and are freed from said last suspension in the selective zone, displacing the flush liquid and said freed lighter components inwardly to and through said separating zone for discharge with initially separated liquid and lighter components, and leading the heavier components from the selective zone outwardly in said locus and discharging the same through the outer periphery of said locus.

2. In a centrifugal separator for separating from one another two different solid components suspended in a liquid, a centrifugal bowl containing an initial separating zone, spaced separating discs in said zone, the bowl having an inlet for the liquid suspension of said solid components to be separated leading to the spaces between said discs and also having in the bowl periphery an outlet for the heavier solid components, the bowl also having inwardly from said initial zone an outlet for the lighter solid components, the bowl also containing outwardly extending parallel surfaces disposed between said peripheral outlet and the outer edges of the discs, said parallel surfaces being inclined to the direction of centrifugal force and defining a narrow slot-shaped channel through which heavier solid components from said initial zone move outwardly to said peripheral outlet, and means for feeding a flush liquid inwardly through said channel and initial zone in countercurrent to the movement of said heavier solid components in said zone and channel, whereby said channel forms a selective zone in which lighter solid components remaining with said heavier components are freed therefrom by the flush liquid.

3. A centrifugal bowl according to claim 2, in which said feeding means include a liquid supply channel opening into the bowl at a region located radially outward from the discs.

4. A centrifugal bowl according to claim 2, in which said surfaces are integral with the discs at their outer edges and are formed by annular enlargements of greater thickness than the discs.

5. A centrifugal bowl according to claim 2, in which the discs are provided with inlet openings for the material to be separated, said feeding means including a liquid supply channel opening into the bowl at a region located radially outward from the discs.

6. A centrifugal bowl according to claim 2, in which some of the discs extend outward beyond the others and have their outer peripheral portions configurated to form a plurality of said surfaces defining a plurality of said slot-shaped channels.

7. A centrifugal bowl according to claim 2, in which said feeding means include liquid feed channels having orifices positioned to discharge the liquid in jets directed toward one of said parallel surfaces.

8. A centrifugal bowl according to claim 2, in which said feeding means include liquid feed channels having orifices positioned to discharge the liquid in jets directed toward one of said surfaces, said surfaces being conical and said orifices being located in one of said parallel surfaces.

9. A centrifugal bowl according to claim 2, the bowl also having a concentrating chamber outside the discs and adapted to receive material concentrated in the spaces between the discs, said selective zone being located outside the concentrating chamber, said feeding means including liquid feed channels having orifices positioned to discharge the liquid in jets directed toward one of said parallel surfaces, said surfaces being conical and said orifices being located in one of said surfaces, the liquid feed channels being constricted to provide a pressure drop in the liquid flowing through them.

10. A centrifugal bowl according to claim 2, the bowl also having a concentrating chamber outside the discs and adapted to receive material concentrated in the spaces between the discs, said selective zone being located outside the concentrating chamber, said feeding means including liquid feed channels having orifices positioned to discharge the liquid in jets directed toward one of said parallel surfaces, said surfaces being conical and said orifices being located in one of said surfaces, the liquid feed channels being constricted to provide a pressure drop in the liquid flowing through them, said liquid feed channels having a plurality of circumferentially spaced openings each having two different diameters, the larger diameter being located nearest the slot-shaped channel.

11. A centrifugal bowl according to claim 2, the bowl also having a concentrating chamber outside the discs and adapted to receive material concentrated in the spaces between the discs, said selective zone being located outside the concentrating chamber, said feeding means including liquid feed channels having orifices positioned to discharge the liquid in jets directed toward one of said parallel surfaces, said surfaces being conical and said orifices being located in one of said surfaces, the liquid feed channels being constricted to provide a pressure drop in the liquid flowing through them, said liquid feed channels having a plurality of circumferentially spaced fine openings terminating in an annular channel opening toward the slot-shaped channel.

12. A centrifugal bowl according to claim 2, the bowl also having a concentrating chamber outside the discs and adapted to receive material concentrated in the spaces between the discs, said selective zone being located outside the concentrating chamber, said feeding means including liquid feed channels having orifices positioned to discharge the liquid in jets directed toward one of said parallel surfaces, said surfaces being conical and said orifices being located in one of said surfaces, the liquid feed channels being constricted to provide a pressure drop in the liquid flowing through them, said liquid feed channels having a plurality of spaced openings arranged in two annular concentric rows dividing said selective zone into sub-zones.

13. A centrifugal bowl according to claim 2, the bowl also having a concentrating chamber outside the discs and adapted to receive material concentrated in the spaces between the discs, said selective zone being located outside the concentrating chamber, said feeding means including liquid feed channels having orifices positioned to discharge the liquid in jets directed toward one of said parallel surfaces, said surfaces being conical and said orifices being located in one of said surfaces, the liquid feed channels being constricted to provide a pressure drop in the liquid flowing through them, said bowl having a pair of concentric, interengaging rings the contacting surfaces of which are recessed to provide openings for delivering the liquid to the slot-shaped channel.

14. A centrifugal bowl according to claim 2, in which said feeding means include liquid feed channels opening into the slot-shaped channel and dividing the same into sub-zones of selective separation, the liquid fed through said feed channels serving to mix the separated components between said sub-zones.

15. A centrifugal bowl according to claim 2, in which said feeding means include liquid feed channels opening into the slot-shaped channel through orifices, the bowl also having a mixing chamber adjacent said orifices and in which the components moving along said selective zone are mixed by the liquid from the orifices.

16. A centrifugal bowl according to claim 2, in which said selective zone is formed by a plurality of consecutive slot-shaped channels forming an angle with one another.

17. A centrifugal bowl according to claim 2, in which the bowl has a slip chamber outside said selective zone and adjacent said peripheral outlet.

18. A centrifugal bowl according to claim 2, the bowl having a concentrating chamber located outwardly from the discs and inwardly from said selective zone, and channels disposed between the discs and the concentrating chamber and through which material to be separated is led to the discs, said last channels opening toward the discs to prevent mixing of the incoming material to be separated and the concentrate in the concentrating chamber and to avoid whirls in said last chamber.

19. A centrifugal bowl according to claim 2, the bowl also having a concentrating chamber disposed inwardly from said selective zone and at least partly filled by the discs, the discs having holes for supplying the material to be separated.

20. A centrifugal bowl according to claim 19, in which the part of the discs extending into the concentrating chamber has a larger cone-angle than the part outside said chamber.

CARL GORAN ECKERS.

REFERENCES CITED

The following references are of record in the file of this patent:

UNITED STATES PATENTS

| Number | Name | Date |
| --- | --- | --- |
| 1,154,575 | McCallum | Sept. 21, 1915 |
| 1,887,476 | Lindgren | Nov. 8, 1932 |
| 2,313,541 | Flowers | Mar. 9, 1943 |

FOREIGN PATENTS

| Number | Country | Date |
| --- | --- | --- |
| 296,670 | Great Britain | May 23, 1929 |
| 363,584 | Great Britain | Dec. 24, 1931 |
| 364,506 | Great Britain | Jan. 7, 1932 |
| 380,415 | Great Britain | Sept. 15, 1932 |
| 567,959 | Great Britain | Mar. 9, 1944 |